United States Patent [19]

Williams

[11] 4,222,402

[45] Sep. 16, 1980

[54] DUAL OVERLAPPING FIRE PROTECTION SYSTEMS AND VALVE

[75] Inventor: John W. Williams, West Chester, Ohio

[73] Assignee: Factory Mutual Research Corporation, Norwood, Mass.

[21] Appl. No.: 824,613

[22] Filed: Aug. 15, 1977

[51] Int. Cl.[3] .............................................. G05D 11/03

[52] U.S. Cl. ...................................... 137/87; 137/118; 137/595

[58] Field of Search ................... 137/87, 98, 100, 109, 137/118, 594, 595, 869, 885

[56] References Cited

U.S. PATENT DOCUMENTS

| | | | |
|---|---|---|---|
| 962,111 | 6/1910 | Assmann | 137/100 |
| 1,080,000 | 12/1913 | Citroen | 137/595 |
| 1,958,288 | 5/1934 | Tyden . | |
| 2,200,578 | 5/1940 | Mahon | 137/595 |
| 2,313,797 | 3/1943 | Bailey | 137/100 |
| 2,515,473 | 7/1950 | Rider . | |
| 2,956,577 | 10/1960 | Kirkham | 137/118 |
| 3,054,423 | 9/1962 | Houle | 137/885 |
| 3,148,364 | 9/1964 | Engels et al. | 137/118 |
| 3,268,270 | 8/1966 | Bailey | 137/595 |
| 3,324,872 | 6/1967 | Cloud | 137/118 |
| 3,494,377 | 2/1970 | Thuse | 137/625.18 |
| 3,536,087 | 10/1970 | Allen | 137/82 |
| 3,709,253 | 1/1973 | Spangenberg | 137/595 |
| 3,827,669 | 8/1974 | Rodgers | 251/62 |
| 3,833,062 | 9/1974 | Livingston | 169/15 |
| 3,957,073 | 5/1976 | Barnum | 137/87 |

FOREIGN PATENT DOCUMENTS

| | | | |
|---|---|---|---|
| 2250936 | 11/1973 | France | 137/109 |
| 44650 | 4/1908 | Switzerland | 137/100 |
| 359338 | 10/1931 | United Kingdom | 137/100 |

*Primary Examiner*—William R. Cline
*Assistant Examiner*—H. Jay Spiegel
*Attorney, Agent, or Firm*—Lane, Aitken, Ziems, Kice & Kananen

[57] ABSTRACT

Dual overlapping fire protection systems include a liquid supply means for supplying liquid under pressure, first and second branch lines connected to the liquid supply means, a plurality of liquid distribution outlets connected to each of the branch lines and located to provide fire protection to a predetermined area, the outlets connected to each branch being located to provide fire protection to the same predetermined area, activating means for automatically activating at least one of the outlets in each branch when a predetermined temperature is sensed, valve means for selectively disconnecting the liquid supply means from the outlets in each branch. The valve is designed to automatically activate the disconnected branch when one of the outlets in the other branch is activated.

4 Claims, 2 Drawing Figures

DUAL OVERLAPPING FIRE PROTECTION SYSTEMS AND VALVE

BACKGROUND OF THE INVENTION

This invention relates to a system for controlling and extinguishing fires and, more particularly, to a system which provides continuous protection for the entire protected area when a portion of the system is out of service and a valve for such a system.

When a plant, warehouse or other facility is protected by a sprinkler system or other type of fire protection system which dispenses material capable of smothering a fire, the protection is not always continuous because there are times when the system must be shut off for servicing or repairs. This can be done by providing a manually operated valve for shutting off the entire system. However, this is unsatisfactory because there is no protection when the valve is off and an element of human error is introduced in returning the system to its operational condition after the servicing or repairs are completed.

Devices have been developed such as a valve which automatically reactivates the system after a predetermined interval so that the sprinkler will not accidently be left off for long periods of time, but even this type of system is still not operational at least a portion of the time and if a fire should develop during the shutdown period there would be no protection available. Further, because of insurance requirements a temporary back-up-system sometimes must be provided for the necessary protection during the shutdown period, which significantly adds to the cost of fire protection, and is generally less reliable and less effective than a fully automatic system.

SUMMARY OF THE INVENTION

One object of the subject invention, in order to solve the problems discussed above, is to provide a fire protection system which is continuously in operation even during the shutdown period for servicing or repairs.

Another object of the invention is to provide a fire protection system which eliminates the possibility that the failure to return the system to its operational condition could be caused by human error.

Yet another object of the invention is to provide continuous fire protection while a portion of the system is shutdown without the need to provide a temporary back-up system.

The system which achieves these and other objects of the present invention includes two separate water lines which lead from a main line, each of the lines having a plurality of sprinkler heads, the heads of each line covering the same general area as the heads of the other line. A valve is provided in each line so that when one line is shutdown the other one will remain open and provide continuous protection for the entire area. In order to automatically reopen the closed line in case a fire occurs the two separate valves can be replaced by a main valve connected to both lines. The main valve operates such that when a manual valve connected between the main valve and one of the lines is opened water under pressure will be introduced into the main valve and cause a piston in the main valve to close that line. An alarm check valve is provided in the other line (which remained open) upstream of the main valve and operates to introduce water under pressure into the main valve on the other side of the piston when the sprinkler heads in that second line are activated, causing the piston to return to its initial position and open the first line. In this way, even though one line has been shut down, when a fire occurs the closed line will automatically open and transmit the full capacity of both lines to their respective sprinkler heads for controlling or extinguishing the fire.

DETAILED DESCRIPTION OF A PREFERRED EMBODIMENT

Figure 1:
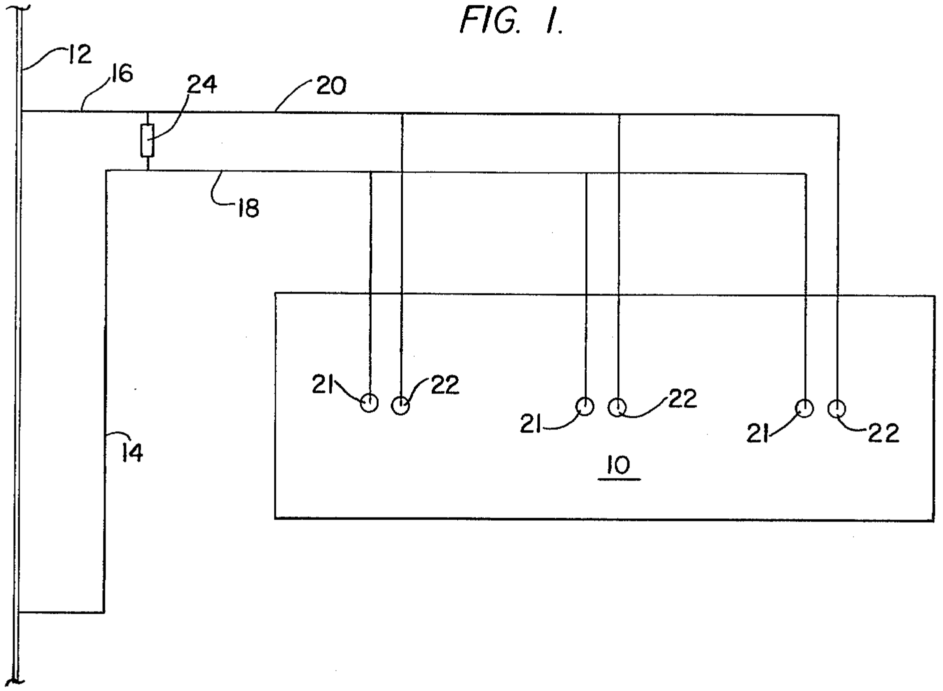
FIG. 1 is a schematic overhead plan view which shows a general arrangement of the sprinkler heads and water lines of the dual overlapping fire protection systems and of the main valve which connects the two lines.

Now, referring to FIG. 1, a preferred embodiment of the dual overlapping sprinkler systems will be described in detail. Reference numeral 10 is used to illustrate a room or warehouse area which is to be protected by the dual overlapping sprinkler systems. A horizontally disposed public water main 12 is located outside of the protected area 10. Branch lines 14, 16, are connected at one end to the public water main 12 and at the other end to feeder lines 18, 20, respectively, each one of which is respectively connected to a set of sprinkler heads designated by numerals 21 or 22. These sprinkler heads are known in the art and are designed and built to automatically release water or other flowable material when subjected to heat of a predetermined temperature. The heat-actuated release can be of any suitable known type and can be built into each sprinkler head. As can be seen in FIG. 1, each adjacent pair of sprinklers 21, 22, is located to spread fluid over approximately the same area to provide overlapping protection to the open area 10. Other spacing arrangements could be used provided that both systems effectively cover the same area. Although the invention is being described in conjunction with sprinklers which distribute water to smother or control fire, it should be understood that the invention can be applied to systems which distribute other types of materials to accomplish the same result.

A valve 24 is connected to feeder lines 18, 20, for selectively disconnecting one or the other of the feeder lines 18 and 20 from its respective branch line 14 and 16, so that one of the systems can be serviced or repaired while the other system remains connected to the main 12 for activation should a fire occur in the area 10. The valve 24 can be of any suitable type for selectively positively blocking the connection between the feeder line and its respective branch line and can be activated manually. Alternatively, a separate valve could be provided in each branch line 14, 16.

Although one might expect that the provision of two sprinkler systems instead of one would be significantly more expensive than a single system, this is not necessarily the case since one entire system can be shut down by a single valve instead of providing a separate valve for each set of sprinkler heads as has been done in the past. Thus, fewer valves are required thereby lowering the overall installation expense. In-plant inspection time is also reduced because there is no need to turn off an individual valve each time a set of sprinkler heads is to be inspected. Moreover, there is no need with two separate systems to provide temporary protection for a plant during the shutdown period, thereby further reducing overall costs. The primary advantage of providing two systems, however, is that the area 10 will always be protected without having to worry about human error in returning the system to its operational condition.

Figure 2:
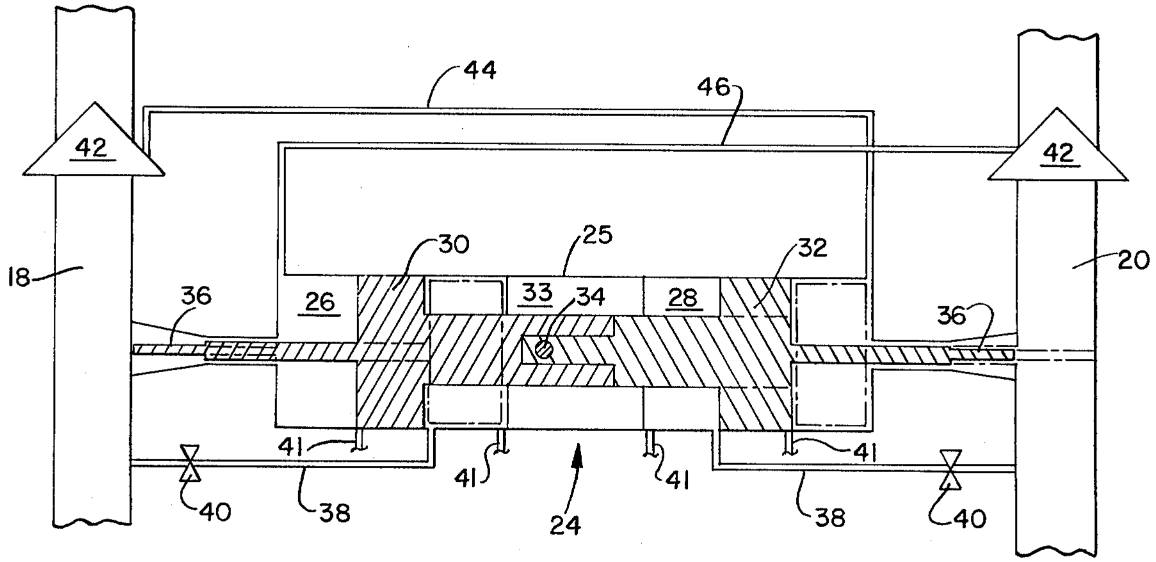
FIG. 2 is a sectional view of an embodiment of the main valve shown schematically in FIG. 1.

An additional feature of the invention is that instead of simply providing the valve 24 as a means for closing one or the other of the feeder lines 18, 20, the valve 24 can be designed as shown in FIG. 2 so that when the valve 24 is used to close one of the systems and the open system is activated the valve 24 will operate to automatically reactivate the closed system so that water will discharge from both sets of sprinklers 21, 22, should a fire occur. An additional cost advantage of this arrangement is that each system would require a smaller diameter pipe so that when both systems are operated together the same density of water would be expelled from the sprinklers 21, 22, together, as would be expelled from the sprinklers in a single system.

As shown in FIG. 2, the valve 24 includes a housing 25 which defines two chambers 26, 28, in which pistons 30, 32, respectively, are located and designed to move back and forth. The stems associated with the pistons 30, 32, are connected in an open area 33 of the housing 25 located between the chambers 26, 28, by means of a pin 34 or other suitable connection which is accessible through a locked opening (not shown) so that there is only limited access to the connection. This is to prevent the valve 24 from being manually overridden to close both systems at the same time.

A gate 36 is connected to the outer side of each of the pistons 30, 32, and is positioned to move in and out of its respective feeder line 18, 20. The solid lines in FIG. 2 show the valve 24 in its normal position where both feeder lines 18, 20, communicate with their respective branch lines 14, 16. The dashed lines show the valve when the gate connected to the piston 32 is moved to close the feeder line 20.

A fluid line 38 connects each of the feeder lines 18, 20, with the portions of the chambers 26, 28, on the inside of the pistons 30, 32, when the pistons are in the normal position shown in FIG. 2. Each of the lines 38 includes a hand operated valve 40 located therein which is normally closed.

In order to disconnect one of the sprinkler systems such as, for example, the one connected to the feeder line 20, the valve 40 which connects the line 38 to that particular feeder line is opened which causes the fluid under pressure in the feeder line to flow through the line 38 and force the piston 32 to the right to the position shown be the dashed lines in FIG. 2. Bleed lines 41 are provided at appropriate places to relieve pressure on the side of the pistons in the direction of movement. Movement of the piston 32 causes the gate 36 to move into the feeder line 20 and block the flow of liquid through it, as shown by the dashed lines. This movement of piston 32 will also cause corresponding movement of the piston 30 to the position shown by the corresponding dashed lines in FIG. 2, but this is of no consequence since it merely causes the gate 36 associated with the piston 30 to move further away from the feeder line 18 as also shown by the dashed lines.

In this way a simple manual adjustment of the valve 40 will operate to entirely disconnect one of the sprinkler systems while the other system (in this example, the one connected to the feeder line 18) remains open should a fire occur.

An alarm check valve 42 is provided in each of the feeder lines 18, 20, as shown in FIG. 2. The term alarm check valve is being used generally to describe a valve known in the art to which an auxiliary line is connected. The valve operates to prevent liquid from flowing through that auxiliary line until liquid is moving through the valve at which time the auxiliary line is opened by movement of the liquid so that the fluid will also flow through the auxiliary line. One type of alarm check valve known in the art includes a chamber with a clapper (not shown) therein which normally covers an opening leading to an auxiliary line until water flows through the chamber. The flowing water causes the clapper to be raised allowing water to flow through the auxiliary lines.

The alarm check valves 42 operate to automatically reactivate the disconnected system if the open system is activated by diverting fluid from the feeder line 18 or 20, whichever is open, through the line 44 and into the chamber 26 or 28 on the outer side of the piston 30 or 32 which is maintaining the disconnected system in its closed condition. For example, referring to the dashed lines in FIG. 2 the feeder line 20 is closed by virtue of the position of the piston 32 and its gate 36. Should any of the sprinklers 21 connected to the feeder line 18 be activated causing water to flow through the alarm check valve 42, some of the water will be diverted through the line 44 and into the portion of the chamber 28 on the outer side of the piston 32. This will cause the piston 32 to move back to its original position shown by the solid lines in FIG. 2 and open the feeder line 20 so that the sprinklers 22 can also be used to extinguish the fire. The alarm check valve 42 located in the feeder line 20 operates in an identical manner, but moving the pistons 30, 32, in the opposite direction.

Thus, it can be seen that if a fire should occur when one of the sprinkler systems is disconnected, the other system remained operational and the valve 24 operates automatically to reactivate the disconnected system when water begins to flow through the operational system. In this way one of the systems can be serviced or repaired, but both systems are operational if needed. It can readily be seen from FIG. 2 and the above description that the valves 24 will work in an identical but opposite manner should the sprinkler system connected to the feeder line 18 be shut down and a fire activates the sprinklers 22 connected to the feeder line 20.

Thus, there is provided in accordance with the invention dual overlapping sprinkler systems which allow one system to be shut down and still provide ample fire protection. In addition, a valve has been designed which connects both sprinkler systems and operates in such a way that should one of the systems be shut down when a fire occurs, the other system will automatically be activated.

It should be apparent that one with ordinary skill in the art will be able to make variations and modifications to the invention and that the invention as defined in the appended claims are contemplated as covering all such variations and modifications.

I claim:

1. A valve mechanism for selectively closing either one of two branch lines connected to a source of fluid under pressure and automatically opening the closed branch line when fluid flows under pressure through the open branch line, the valve mechanism comprising a pair of chambers, a piston in each chamber movable between first and second positions, said pistons being connected to each other, closure means connected to each piston for closing and positively blocking flow through its respective branch line when the piston is in the second position, first fluid supply means connecting a branch line upstream of the closure means to each chamber for supplying fluid thereto to move the respective pistons to the second position, first activating means connected to said first fluid supply means for activating said first fluid supply means to supply fluid to one or the other of said chambers to move the respective piston toward the second position, second fluid supply means connected to each chamber for supplying fluid thereto to move the respective pistons to the first position and second activating means in each branch line and connected to said second fluid supply means for automatically activating each second fluid supply means and moving the piston associated with the closed branch line toward the first position when fluid flows through the branch line associated with the other piston.

2. The valve mechanism in claim 1, wherein the closure means includes a gate valve.

3. The valve mechanism in claim 1, wherein each first fluid supply means includes a first fluid line connecting a chamber with its respective branch line upstream from the closure means, the first activating means including a valve means in the line.

4. The valve mechanism in claim 1, wherein each second fluid supply means includes a second fluid line connecting a chamber with the branch line associated with the other chamber, each second activating means including a valve means for preventing fluid from flowing through the second fluid line when fluid is not flowing through its respective branch line and automatically allowing fluid to flow through the second fluid line when fluid is flowing through its respective branch line.

* * * * *